United States Patent [19]

Arimura et al.

[11] 3,974,018
[45] Aug. 10, 1976

[54] DEVICE FOR MAKING PNEUMATIC TIRES
[75] Inventors: Iwao Arimura, Kodaire; Yasuo Suzuki, Tokyo, both of Japan
[73] Assignee: Bridgestone Tire Company Limited, Tokyo, Japan
[22] Filed: Dec. 12, 1974
[21] Appl. No.: 532,308

Related U.S. Application Data
[63] Continuation-in-part of Ser. No. 272,887, July 18, 1972, abandoned.

[30] Foreign Application Priority Data
July 30, 1971 Japan.................................. 46-57349

[52] U.S. Cl................................ 156/394; 156/125; 156/128 R; 264/315; 264/326; 425/27; 425/46
[51] Int. Cl.²........................................... B29H 5/06
[58] Field of Search ........... 156/110, 123, 125, 128, 156/394; 264/315, 316, 326, 36, 46.4, 46.9; 425/242, 251, 252, 23, 27, 44, 46, 48, 90, 95

[56] References Cited
UNITED STATES PATENTS

| | | | |
|---|---|---|---|
| 2,497,226 | 2/1950 | McNeill.......................... | 156/128 R |
| 2,672,914 | 3/1954 | Weigold et al...................... | 156/125 |
| 3,386,485 | 6/1968 | Harrison et al................ | 156/110 R |
| 3,849,220 | 11/1974 | Suzuki et al..................... | 156/110 R |

FOREIGN PATENTS OR APPLICATIONS

| | | | |
|---|---|---|---|
| 689,253 | 6/1953 | Canada.............................. | 156/128 |
| 508,367 | 12/1954 | Canada.............................. | 156/125 |
| 1,060,928 | 4/1954 | France............................... | 156/129 |

*Primary Examiner*—Douglas J. Drummond
*Assistant Examiner*—John E. Kittle
*Attorney, Agent, or Firm*—Fleit & Jacobson

[57] ABSTRACT

A device for making a pneumatic tire including an outer mold and a core for making tread rubber having a high lug or deep tread pattern and an inflatable bladder for use in joining the tread rubber to the tread portion of a green case when the green case is shaped and vulcanized.

6 Claims, 16 Drawing Figures

Prior Art
FIG_1
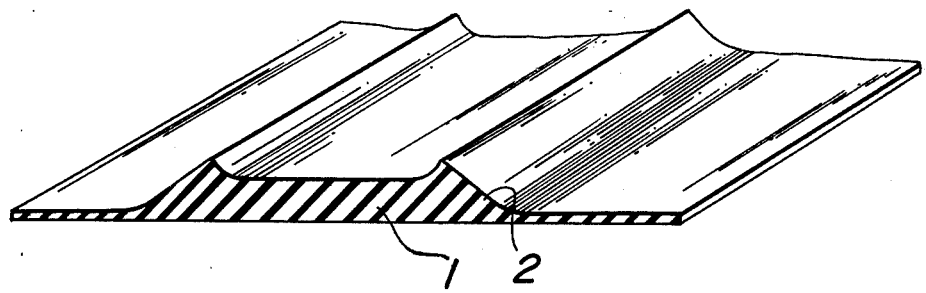
FIG_2A
Prior Art
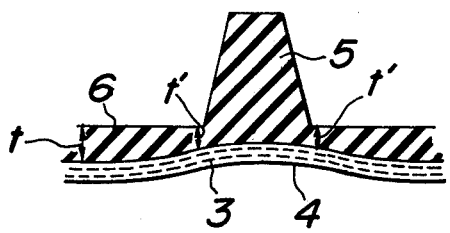
FIG_2B
Prior Art
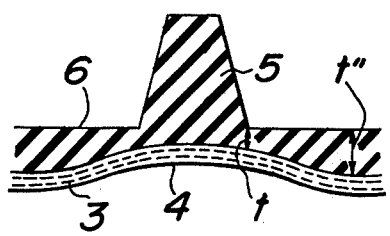
FIG_3A
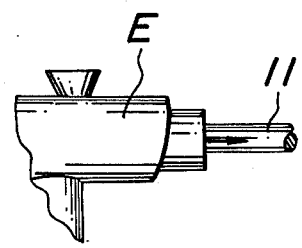

FIG_3B
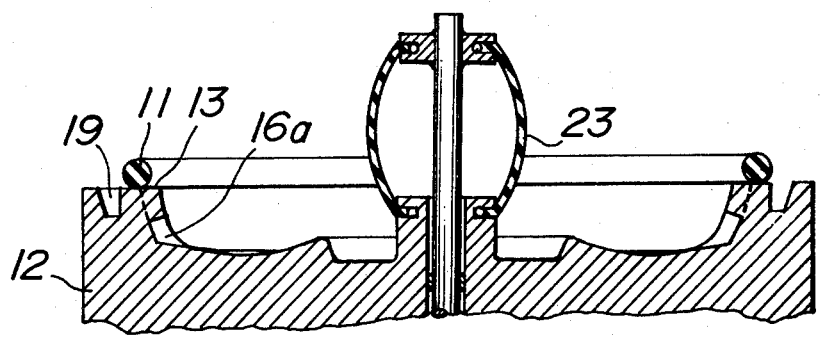
FIG_3C
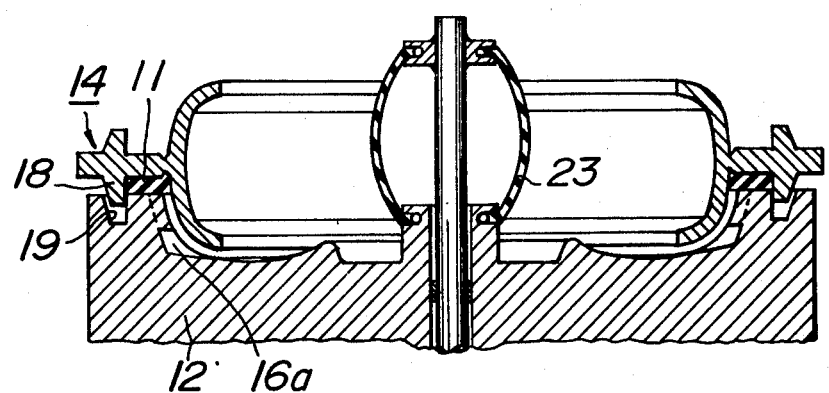
FIG_3D
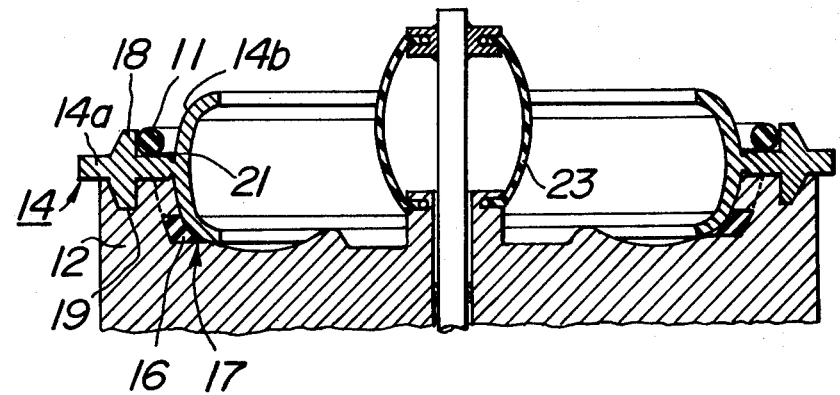

FIG._3E
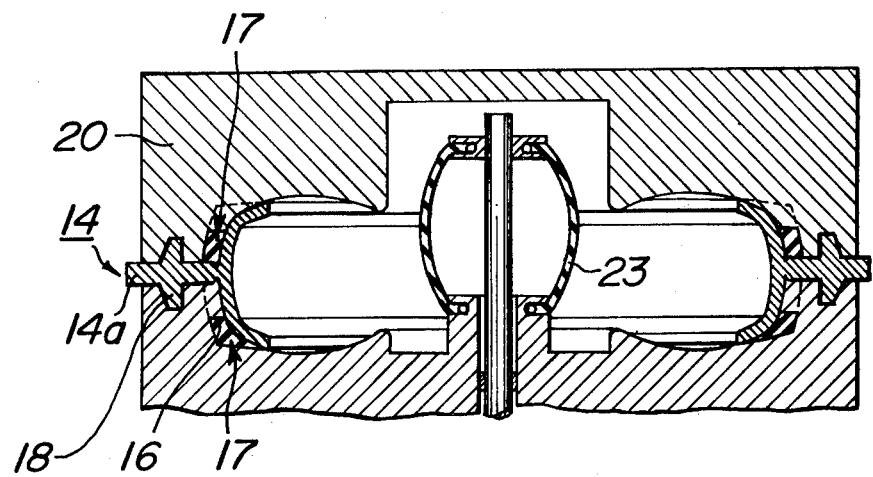
FIG._4
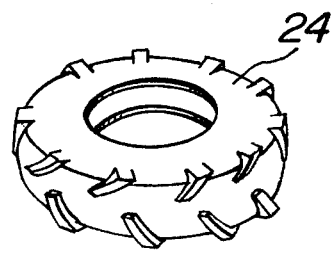

FIG_3F
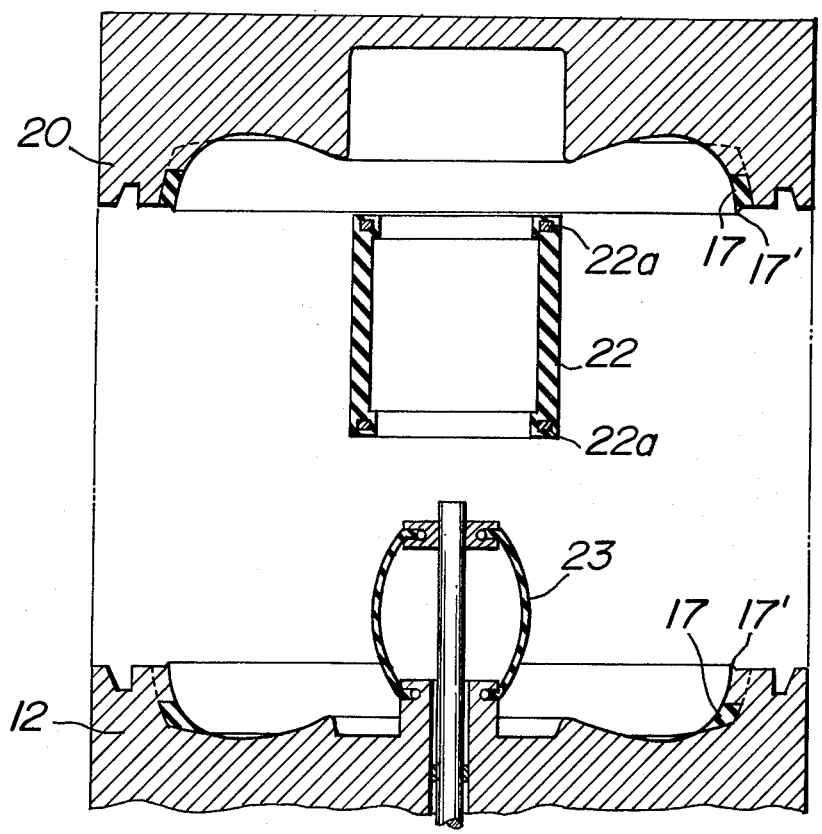
FIG_3G
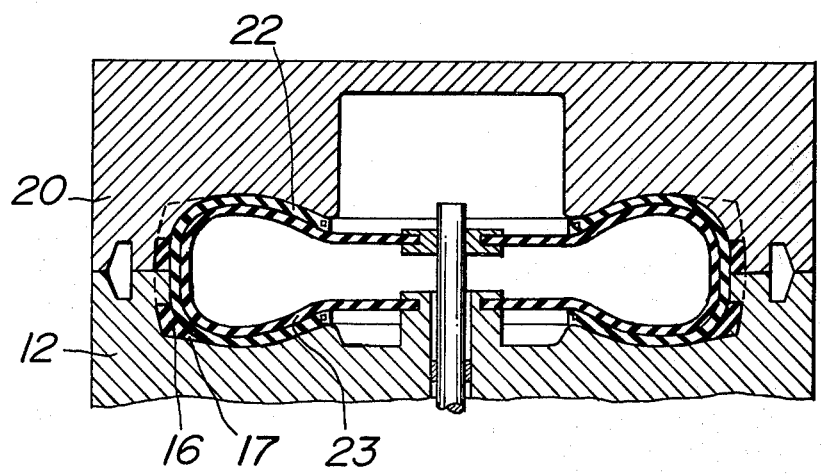

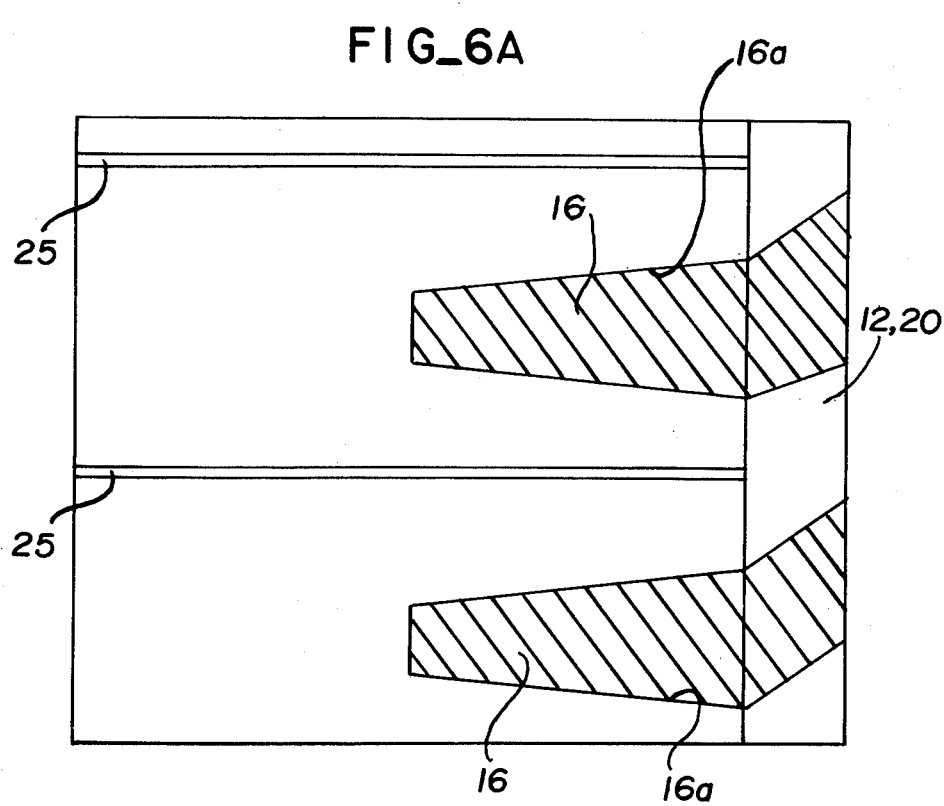
FIG_6A
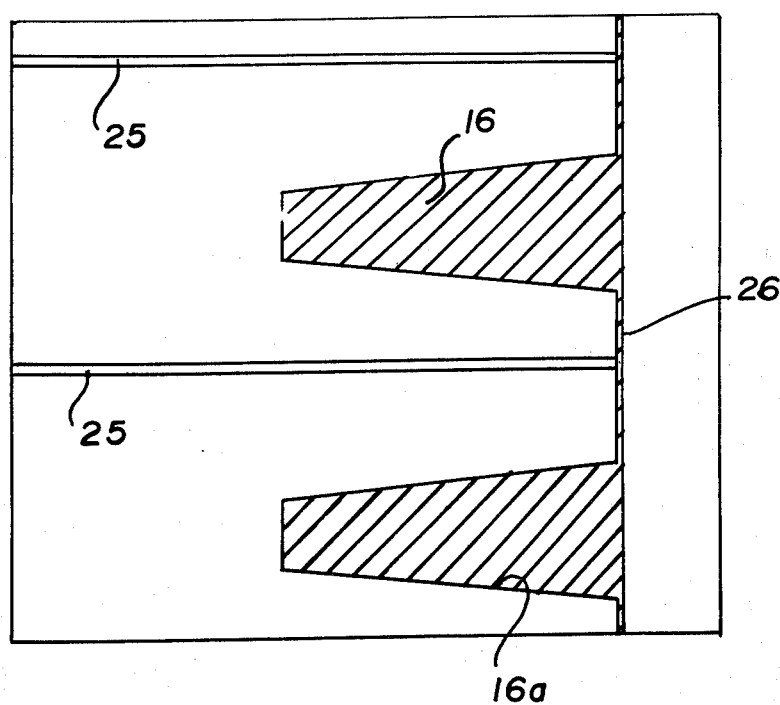
FIG_6B

FIG_6C
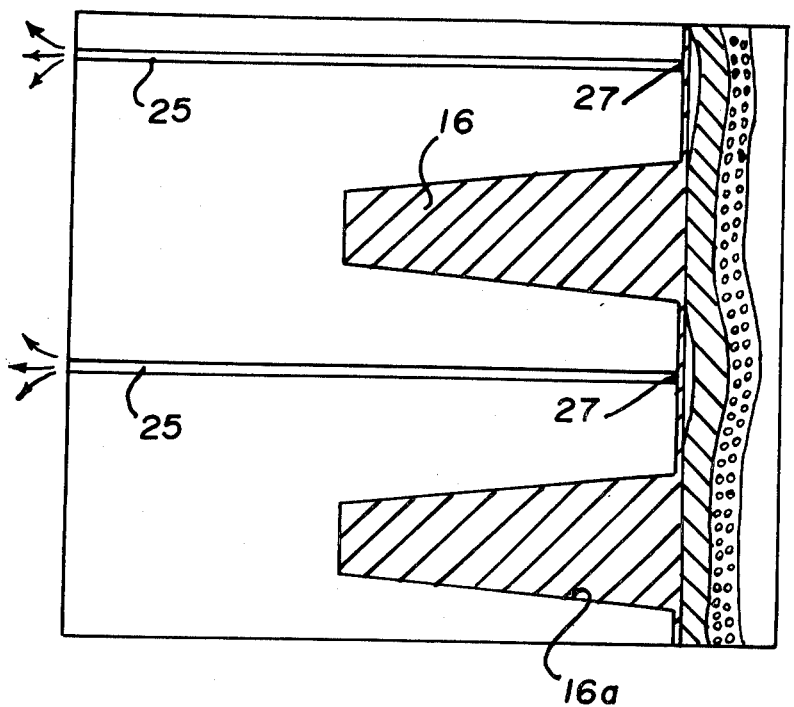
FIG_6D
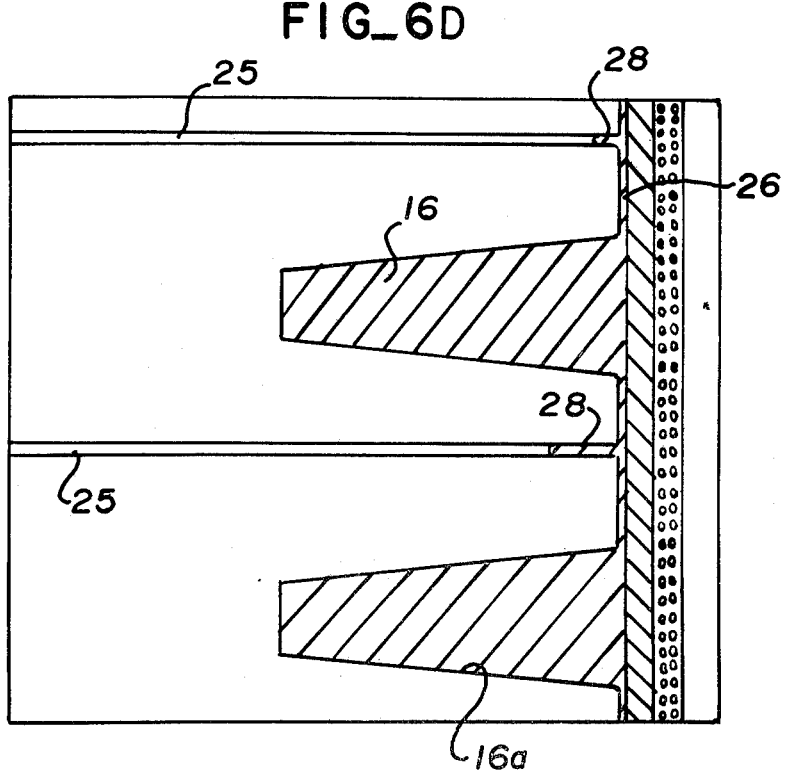

DEVICE FOR MAKING PNEUMATIC TIRES

CROSS-REFERENCE TO RELATED APPLICATION

This application is a continuation-in-part of Ser. No. 272,887, filed July 18, 1972, now abandoned.

BACKGROUND OF THE INVENTION

1. Field of the Invention

This invention relates to a device for making pneumatic tires, and more particularly to a tire-making apparatus, in which tire tread rubber is separately formed in a toroidal or cylindrical form and the tire tread rubber is integrally bonded to the outer peripheral surface of a green case in the course of vulcanizing the latter. The green case, which is preformed on a separate former, comprises a pair of wire beads and a carcass extending across the two wire beads. The green case normally includes a peripheral rubber layer overlaid on the outer surface of the carcass along the circumference thereof. The toroidal tire-tread rubber may be bonded to the green case in a mold for shaping and vulcanizing the green case into a pneumatic tire.

2. Description of the Prior Art

In the conventional process of making pneumatic tires, a green case is formed by spreading and winding one or more rubberized cord carcass layers on a cylindrical metallic former, disposing annular beads at suitable positions on the rubberized cord layer, and applying a separately formed tread rubber layer on the outermost surface of the rubberized cord layer. The tread rubber layer is formed by extrusion. The green case is then removed from the metallic former and shaped in a metal mold into a toroidal form. After being shaped, it is vulcanized in the metal mold at a suitable temperature and pressure so as to provide the desired pneumatic tire.

To improve the performance or operating characteristics of pneumatic tires, various kinds of tread patterns have been proposed. In some of the tread patterns, the thickness of the tire tread rubber layer widely varies. Since the configuration of the tread rubber layer is greatly changed in the course of the aforesaid vulcanization in the metal mold, it has been difficult to provide the desired tread pattern on the extruded tire-tread rubber layer to be applied on the outer surface of the green case. To form a complicated tread pattern having a wide variation in its cross-sectional shape, the rubber material in the separately extruded tread rubber layer on the green case must be flowed over a considerably large distance, because the cross-sectional shape of an extruded tread rubber layer is substantially uniform throughout the tread rubber layer and the widely-varying cross-sectional shape cannot be made by extrusion. Such flow of the rubber material in the tread portion tends to cause either or both of the breaker and carcass layers to be distorted from the smooth regular toroidal carcass shape, so that undulations are caused in the carcass layer beneath the tread rubber layer.

In order to mitigate such difficulty, Canadian Patent No. 853,659, which was issued to The Dunlop Company Limited on Oct. 13, 1970, teaches a method of making a pneumatic tire by using a discontinuous ring made of segments which are separately prepared and joined to the outer periphery of a carcass through an assembling operation. This Canadian Patent, however, is rather complicated because a number of different tread segments must be formed, and they must be connected to one tire carcass in proper alignment with each other. U.S. Pat. No. 3,386,485, which was granted to Stanley R. Harrison et al. on June 4, 1968, and U.S. Pat. No. 3,425,475, which was patented to Kenneth A. Hoy on Feb. 4, 1969, teach the art of making tubeless tires in which the need of assembling a tire tread on a carcass is completely eliminated. The tubeless tires of the aforesaid two U.S. patents have shortcomings in that they can be used only at a comparatively low pressure, and it is rather difficult to form deep tread patterns on the tread portion of such tubeless tires.

Therefore, an object of the present invention is to provide an improved method and apparatus for making pneumatic tires with a complicated tread pattern.

SUMMARY OF THE INVENTION

In order to fulfill the aforesaid and other objects of the invention, tread rubber is formed by using a combination of an outer mold having a molding surface suitable for making a desired tread pattern and a core cooperating with the outer mold. The outer mold consists of two halves, a lower half and an upper half, each having a number of vent holes, which halves are separately engageable with each other at a mid-circumferential plane of a tire to be molded thereby. The core is insertable into a molding cavity defined between the two halves of the outer mold. An inflatable bladder is placed in the central portion of the molding cavity of the outer mold.

After separately making the tire-tread rubber between the peripheral surface of the molding cavity of the outer mold and the outer peripheral surface of the core, the core is removed from the outer mold, while leaving the tire-tread rubber in tread pattern recesses on the outer peripheral surface of the cavity of the mold. A separately prepared green case, which has no rubber layer for forming lugs, is placed in the molding cavity of the outer mold at a position between the inflatable bladder and the outer peripheral surface of the cavity.

Upon inflation of the bladder, the green case is forced toward the outer peripheral surface of the molding cavity of the outer mold. Since the tread rubber is left in the tread pattern recesses on the outer peripheral surface of the molding cavity of the outer mold, the green case is forced against the tire-tread rubber. The shape of the peripheral portion of the molding cavity of the outer mold is such that the green case is formed into the desired toroidal shape. Upon application of heat and pressure for vulcanization, the green case is bonded to the tread rubber and the tire itself is vulcanized and shaped into the desired shape. At the same time, any air trapped between the inner wall of the outer mold and the green case is exhausted through the vent holes.

BRIEF DESCRIPTION OF THE DRAWING

For a better understanding of the invention, reference is made to the accompanying drawing, in which:

FIG. 1 is a partial perspective view of an extruded tread rubber layer used in a conventional tire-making device;

FIGS. 2A and 2B are schematic cross-sectional views illustrating undulation of the carcass of a prior art tire at a position directly below a lug of a deep tread pattern;

FIG. 3A is a schematic view of an extruder for making a rubber rod material to be used for making tread rubber to be used in a device according to the present invention;

FIGS. 3B to 3G are schematic cross-sectional views illustrating different steps of using the tire-making device according to the present invention;

FIG. 4 is a schematic perspective view of a pneumatic tire with a deep tread pattern which is made by the device of the present invention;

FIGS. 6A to 6D are schematic cross-sectional views illustrating the vent holes in the outer mold of the device of the present invention.

Like parts are designated by like numerals and symbols throughout the figures of the accompanying drawings.

DESCRIPTION OF THE PREFERRED EMBODIMENT

Figure 5:
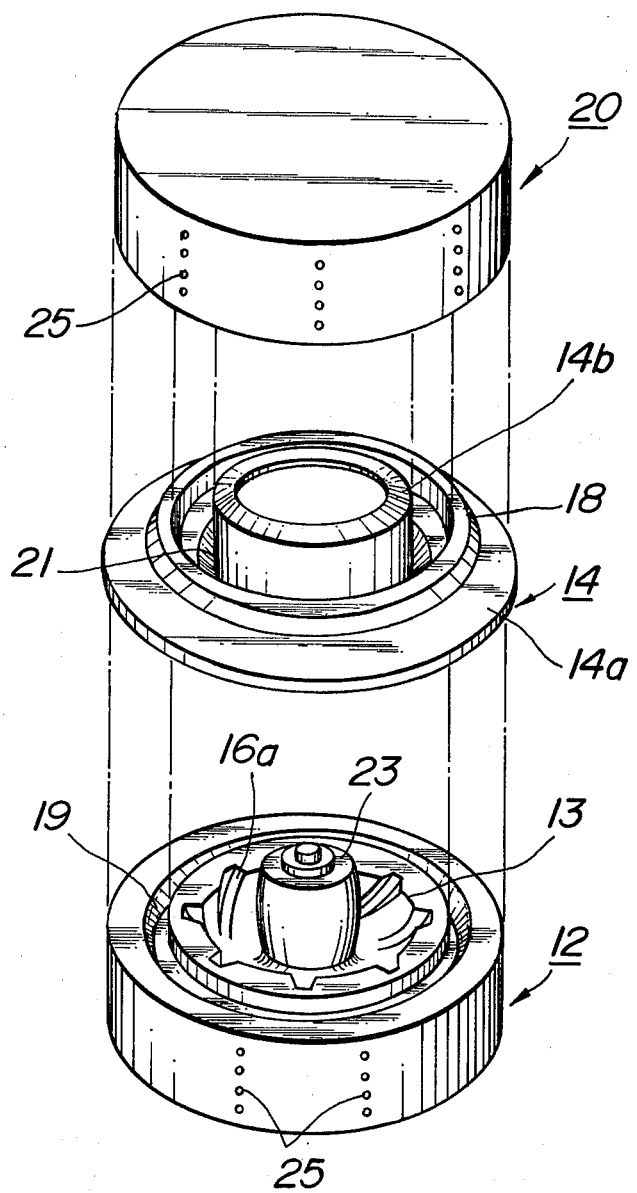
FIG. 5 is an exploded perspective view of a mold assembly which is suitable for making a pneumatic tire in accordance with the steps of FIGS. 3B to 3G.

Referring to FIG. 1, in a conventional tire-making device, an extruded tire tread rubber layer 1 having a uniform cross-sectional shape is secured to the outer peripheral portion of a green case. The tread rubber layer 1 has a contour 2 including one or more thickened portions, which will be formed into lugs in succeeding shaping and vulcanizing steps, so as to produce the desired tread pattern.

FIG. 2A illustrates an enlarged schematic cross-sectional view of a tread lug 5 formed on the tread portion of a pneumatic tire by a conventional shaping process while using the tread rubber layer 1 of FIG. 1. Since the shaping of the tread is carried out together with the vulcanization, tire carcass plies 3 integrally bonded to the tread rubber layer are also deformed as the tread rubber layer is modified from the shape shown in FIG. 1. As the magnitude of the deformation of the tread lug 5 from the shape of FIG. 1 increases, the deformation of the carcass plies 3 also increases. Consequently, undulations 4 may be caused, as shown in FIG. 2A. From the standpoint of performance characteristics of pneumatic tires, such undulations 4 are not desirable, because they will cause uneven distribution of mechanical load which may lead to excessive stress concentration at certain portions thereof. In the case of tires with a deep tread pattern or tires of high lug type, e.g., tires for agricultural use, the risk of the occurrence of such undulations 4 is high.

In FIG. 2A, the deformation of the carcass plies 3 tends to reduce the thickness or gauge $t$ of the skid base portion 6 in the tread rubber of the vulcanized tire at root portions of the lug 5, as shown by the symbol $t'$. Such reduction of the skid base gauge is undesirable because it tends to weaken the tire. To compensate for the thickness decrement $(t-t')$, it has been common practice to use an increased skid base gauge $t''$, as shown in FIG. 2B. The increased skid base gauge inevitably results in a cost rise due to the increase of rubber material necessary for making it. Furthermore, the increased skid base gauge results in an increase in the weight of the pneumatic tire itself, which may deteriorate tire floatation properties required for tires of agricultural use.

The occurrence of undulations 4 on the inner surface of the tread rubber layer is particularly undesirable for tubeless tires. More particularly, an inner lining rubber layer is provided on the inner surface of a tubeless tire, so as to ensure gastight sealing of the tire inside space, in a manner similar to that of an inner rubber tube of conventional pneumatic tires. If undulations of considerably large magnitude are caused on the tread portion of the tubeless tire, the inner lining rubber becomes uneven, as described above by referring to FIG. 2A. Any unevenness in the inner lining rubber may deteriorate its gas-tight sealing.

An object of the present invention is to obviate the aforesaid difficulty of the conventional tire-making process. The improved tire-making device according to the present invention will now be described by referring to FIGS. 3A to 3G, as well as FIGS. 4, 5 and 6A to 6D.

FIGS. 3A to 3G illustrate a device for making pneumatic tires according to the present invention and in particular a PT 17×6–8 4PR tire (standing for an outside diameter of 17 inches, a tire width of 6 inches, a rim diameter of 8 inches, and 4 carcass plies), as shown in FIG. 4. A rubber rod of 29.0 mm diameter is extruded by a rubber extruder E, by using a rubber composition which is commonly used for making tire treads. The rubber rod 11 is cut at a length of 1,350 mm, and it is so bent as to form a circular loop. A mold assembly is separately prepared which comprises a lower half mold 12, an upper half mold 20, and a core 14, as shown in FIG. 5. An inflatable bladder 23 is disposed at the central portion of the lower half mold 12. The bladder 23 may be mounted on the upper half mold 20, if so desired. Both of the upper and lower half molds have molding cavities, respectively. The circular loop of the rubber rod 11 is placed on the top edge portion 13 of the molding cavity of the lower half mold 12, as shown in FIG. 3B.

The core 14 of the mold assembly has an annular flange portion 14a to be operatively inserted between the upper and lower half molds 12 and 20, and a cylindrical molding surface 14b secured to the central opening of the annular flange 14a, so as to extend upwardly and downwardly from the plane of the annular flange 14a in symmetry relative to the annular flange. When the entire molding assembly inclusive of the two half molds 12, 20 and the core 14, is properly assembled, the cylindrical molding surface 14b faces the peripheral surfaces of the molding cavities of the two half molds. There is little or no spacing between the cylindrical molding surface 14b and the peripheral surfaces of the molding cavities of the two half molds so that little or no tread rubber connects the lugs of the tire tread as described hereinafter.

After the circular loop of the rubber rod 11 is placed on the annular edge portion 13 of the lower half mold 12, the core 14 is placed on the rubber rod 11, as shown in FIG. 3C. Then, the core 14 is forced downward by a suitable press (not shown), as shown in FIG. 3D. Consequently, one half of the desired tread rubber 17 is formed between the molding surface of the lower half mold 12 and the cylindrical molding surface 14b of the core 14. Suitable recesses 16a (FIG. 5) are provided on the circumferential peripheral portion of the molding surface of the lower half mold 12, so that lugs 16 are formed therein.

Referring to FIGS. 3E and 5, the annular flange portion 14a of the core 14 has a pair of annular projections 18, and an annular recess 19 is formed in each of the upper half core 20 and lower half core 12, so as to snugly receive the annular projections 18 therein. With the engagement between the annular projections 18 of the core 14 and the annular recesses 19 of the molds, the core is correctly registered with the molds. The annular projections 18 also act to prevent the rubber material of the tread rubber 17 from being extruded to the outside of the half molds 12 and 20 at the joint thereof.

It is apparent that the rubber rod 11 should be long enough to form a continuous rubber ring along the annular inner edge portion 13 of the lower half mold 12, and the diameter of the rubber rod 11 itself should be so selected as to provide a sufficient amount of rubber material for each half of the tread rubber 17.

After the lower half is made, the upper half of the tread rubber 17 is similarly molded, by using the upper half of the cylindrical molding surface 14b of the core 14 and the upper half mold 20, as shown in FIG. 3E.

In making the tread rubber 17, the rubber material constituting the tread rubber 17 is heated at an elevated temperature, e.g., 60°C to 120°C, for 3 minutes to 10 minutes. This high temperature is for facilitating the flow of the rubber material in the molding process, but it should be low enough not to vulcanize the rubber material. Preferably, the tread rubber 17 is made by heating it at 120°C for 5 minutes. In the tests carried out by the inventors, a surface pressure of 126 Kg/cm$^2$ is used for molding the tread rubber 17. In general, the molding of such rubber can be effected at a pressure of 60 to 80 Kg/cm$^2$. Although the lower and upper halves of the tread rubber 17 are separately made in the tests, it is also possible to simultaneously form the two halves of the tread rubber 17 in one operation by using both of the upper and lower half molds 20 and 12 at a time.

Upon completion of the shaping or molding of the two halves of the tread rubber 17, the upper half mold 20 is moved away from the lower half mold 12 for removing the core 14 from the two half molds, while leaving the tread rubber 17 in the recesses 16a. To facilitate the separation of the core 14 from the tread rubber 17 while leaving the latter in the recesses 16a of the half molds 12 and 20, the entire molding surface 14b of the core 14 may be plated with a chromium layer of 1/100 mm to 4/100 mm thickness. For the same purposes, the tread portion and particularly recesses 16a of the molding surface of the upper and lower half molds 12 and 20 may be roughened for holding the tread rubber 17 thereon.

Referring to FIG. 3D, tapered surfaces 21 are formed at the joints between the cylindrical molding surface 14b and the opposing surfaces of the annular flange 14a of the core 14. Thereby tapered joining edges 17' are formed on the mid-circumferential edge portions of the tread rubber 17 as shown in FIG. 3F. Preferably the joining edge 17' of the tread rubber 17 extends about 3 mm from the mid-circumferential plane of the tread rubber towards the other half thereof.

Referring to FIG. 3F, a separately prepared green case 22 is placed in the molding cavity of the lower half mold 12, so as to surround the inflatable bladder 23. For purposes of illustration, only the rubber side wall and the bead wires 22a of the green case 22 are shown in FIG. 3F. It is, however, understood that the green case 22 also includes carcass layers, which may be made of rubberized fibrous cords or the like, and an inner liner rubber layer applied to the inner surface of the carcass layers. After the green case 22 is placed in position within the lower half mold 12, the upper half mold 20 is brought in direct contact with the lower half mold 12 without using the core 14, while inflating the bladder 23. Whereby, the green case 22 is shaped into a toroidal form as shown in FIG. 3G. Upon vulcanizing the green case 22 and the tread rubber 17 within the molding cavity between the two half molds 12 and 20, the tread rubber 17 is integrally secured to the rubber layer of the green case 22. The vulcanization is, of course, carried out at a suitable high temperature and pressure. Thus, a desired tire 24 is made, as shown in FIG. 4.

It is apparent from the foregoing description that, in the vulcanizing step of FIG. 3G, the tread rubber 17 is simply bonded to the green case 22, and any significant rubber flow is not caused in this layer to form the tread pattern. Thus, the shaping stress is evenly distributed throughout the carcass layers in the course of the shaping and vulcanizing operations in FIG. 3G. Whereby, the risk of generating undulations 4, as shown in FIG. 2A, is completely eliminated. As a result, the need of extra thickness $t''$ of the rubber layer for ensuring a proper skid base gauge $t$, as shown in FIG. 2B, is also eliminated.

It was found in the tests that the fluctuation of the skid base gauge of the tire 24 of PT 17×6-8 4PR made by the device according to the present invention was in a range of 2.00 mm to 2.25 mm. This fluctuation is very small, as compared with conventional values in a range of 2 mm to 9 mm. The fluctuation of the inner liner gauge of the tire 24 made by the device of the present invention proved to be 1.00 mm to 1.25 mm, which is remarkably small as compared with a conventional fluctuation range of 1.0 mm to 2.5 mm.

In the embodiment of FIGS. 3A to 3G, the tire tread lugs 16 are formed within the half molds in discontinuous or isolated fashion as shown in FIG. 6A or are connected together by a very thin layer of tread rubber as shown in FIG. 6B. In either case, however, tread rubber 17 which comprises tread lugs 16 and the connecting tread rubber, if any, is bonded to a uniformly shaped tread portion of a green case in the course of shaping the green case into the desired toroidal form.

The risk of entrapping air between the tread rubber of tread lugs and the green case is eliminated by providing vent holes 25 (e.g., 1 to 1.5 millimeter diameter) through the half molds 12 and 20 as shown in FIG. 5 and FIGS. 6A to 6D. As previously mentioned, the tread lugs 16 or tread layers are formed in a discontinuous or isolated fashion and bonded to a uniformly shaped tread portion of a green case 22 in the course of shaping the green case into a desired toroidal form. If the tread lugs should be connected in the circumferential direction due to spaces between outer molds 12 and 20 and core 14, the connecting portions 26 of lugs 16 will be very thin, so that there is no risk of entrapping air between the tread rubber 17 or tread lugs 16 and green case 22.

If there is no clearance between the inner surfaces of the molds 12 and 20 and the outer surfaces of the core 14, air between the inner wall of the molds 12 and 20 and the green case 22 will be exhausted through vent holes 25, so that after vulcanization the lugs 16 unite with the green case 22 without spoiling the external appearance of the tire. If there is a slight clearance between the inner surfaces of the molds 12 and 20 and the outer surfaces of the core 14, the pattern elements are united with each other by means of the thin rubber 26 in the clearance to close the vent holes 25. In this case, however, the thin rubber 26 is so thin that the air trapped between rubber layer 26 and green case 22 can be exhausted through holes 27 naturally formed in the thin rubber 26 by the pressure during vulcanization. After vulcanization, spews 28 extending into the vent holes 25 can readily be removed together with the completed tire from the mold. When vulcanization, the thin rubber 26 is heated and softened to facilitate an occurrence of the holes 27 thereby achieving the complete exhaust of the air.

As described in the foregoing disclosure, according to the present invention, there is provided a novel device for making pneumatic tires which eliminates the unevenness of tire carcass and skid base gauge. Furthermore, with the device of the present invention, a complicated extruder for making tread rubber layers with a complicated contour shape can be simplified, because a simple rubber rod of circular cross-sectional shape can be used as the starting material for fabricating the tread rubber. The shape of the illustrated tread rubber is substantially cylindrical, but it is also possible to make the tread rubber toroidal, so as to cause the toroidal rubber to enclose the entire outer surface of a toroidally-shaped green case.

What is claimed is:

1. A mold assembly for making a pneumatic tire having a high lug or deep tread pattern, comprising an outer mold defining a tire-shaping cavity therein and having an upper half and a lower half separably joined along a mid-circumferential plane of the tire-shaping cavity, tread pattern recesses arranged in a circumferential direction at positions corresponding to the tread portion of said tire, said outer mold having an inflatable bladder secured to one of the mold halves so as to be positioned at a central portion of the tire-shaping cavity formed in said outer mold, and annular recesses at the joined portion of said mold halves, said annular recesses being spaced from said tire-shaping cavity a determined distance for arranging rubber rods to be formed into lugs, said annular recesses being wedge-shaped in cross-section and having inner surfaces substantially at right angles to said mid-circumferential plane; and an annular core replaceably positioned in the inside of said tire-shaping cavity, said annular core having a mold surface of the same shape as the inner surface of said tire-shaping cavity in the region of said tread pattern recesses and being adapted to fit substantially in close contact with said inner surface of said tire-shaping cavity, said mold surface having a width in the axial direction of the tire which is substantially the same as the width of said tread portion of the tire, said mold surface being formed on a radially outer peripheral surface of the core and adapted to close the tread pattern recesses in said cavity, said mold surface of the core being plated with a chromium layer of 1/100 mm to 4/100 mm thickness and being smoother than the opposed inner surface of the tire-shaping cavity, said core having an annular flange integrally extending radially outwardly from a central outer surface so as to be positioned between said mold halves at said joined portion, said annular flange being provided with wedge-shaped projections extending from both sides of the flange so as to snugly fit within said wedge-shaped annular recesses, and said mold halves having a number of vent holes communicating with said tire-shaping cavity in the area opposed to said mold surface of the core.

2. A mold assembly as set forth in claim 1, wherein said annular flange of the annular core is positioned substantially horizontal when being assembled to the outer mold.

3. A mold assembly as set forth in claim 1, wherein said inflatable bladder is secured to the lower one of said mold halves.

4. A mold assembly as set forth in claim 1, wherein said annular flange of said annular core has at its point of extension from said annular core and at least on one side a tapered surface continuous in the circumferential direction.

5. A mold assembly as set forth in claim 4, wherein said tapered surface is provided on each side of said annular flange.

6. A mold assembly as set forth in claim 1, wherein the shape of said annular core is symmetrical relative to said annular flange.

* * * * *